MANUFACTURE OF GUANIDINE NITRATE

Elwyn Roberts, Eltham, London, and Thomas Martin, Waltham Cross, England, assignors to Minister of Aviation in Her Majesty's Government of the United Kingdom of Great Britain and Northern Ireland, London, England
Filed May 5, 1959, Ser. No. 811,218
Claims priority, application Great Britain May 6, 1958
3 Claims. (Cl. 260—564)

The present invention relates to improvements in the manufacture of guanidine nitrate by the reaction of urea with ammonium nitrate in the presence of silica gel, which may be theoretically represented by the following equation:

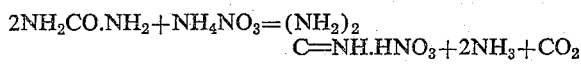

This reaction has obvious advantages over other processes which have been used in that the guanidine nitrate is produced in one stage from readily available compounds. It is usually carried out at a temperature not exceeding 200° C. (in the range 160°–200° C.), above which decomposition of guanidine nitrate becomes manifest. Although the theoretical equation given above requires two mols of urea to one mol of ammonium nitrate, the amount of urea supplied in a practical process is less than the amount theoretically required and urea and ammonium nitrate should be employed in proportions which are of the order of equimolar. When the reactants are used in the molar quantities urea (2 mols), ammonium nitrate (2 mols), silica gel (1 mol; 200/300 mesh size) and the reaction carried out by heating to 200° C. for a period of two hours then the following equation is typical:

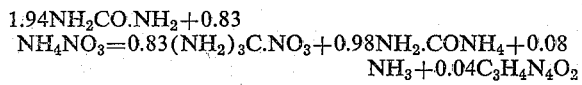

The carbon dioxide and nearly all the ammonia in the theoretical equation have combined to form ammonium carbamate, while a small amount (0.04) of a by-product, ammelide is also formed.

The time for the completion of the reaction at 200° C. is dependent upon the grist size of silica gel; in the case of silica gel of 200/300 mesh and 18/30 mesh the reaction times are 2 hours and 4 hours respectively. Again, the ratio of ammonium carbamate to guanidine nitrate is dependent upon the degree of hydration of the silica gel used and to the water content of the reactants, urea and ammonium nitrate.

If the reaction is allowed to proceed at a temperature below 200° C., that is, within the range 160° C. to 200° C., then the rate and extent of formation of the principal product of the reaction, guanidine nitrate, and also of the insoluble by-product, ammelide, is correspondingly reduced. The time required for a particular conversion of urea to guanidine nitrate thus increases the lower the temperature of reaction and preferably the operating temperature is fairly high in the range 160°–200° C.

The amount of ammelide formed is primarily dependent upon the molar ratio or urea and ammonium nitrate used; the amount formed decreases as this ratio decreases from 2:1 to the optimum ratio 2:2 and also decreases with increase in the ratio of silica gel.

When the reaction is carried out batchwise to completion under the above conditions the ammonium carbamate is liberated in corresponding stoichiometric amounts of ammonia and carbon dioxide, which can be recycled to urea, whilst the residue consists of guanidine nitrate, ammonium nitrate (excess used for reaction), silica gel and the insoluble by-product ammelide. In order to recover the guanidine nitrate it is usual to extract the residue with hot water, filter off the insoluble silica gel and ammelide and recrystallize the guanidine nitrate, from the aqueous liquor containing ammonium nitrate.

When the reaction is carried out in a continuous manner by allowing the mixture of urea and ammonium nitrate to flow in a molten state over the heated silica gel (preferably arranged so that the reaction proceeds to or near completion) then the reaction product comprises guanidine nitrate, ammonium nitrate (excess used for reaction), and any unreacted urea and insoluble by-product (ammelide). Again it is usual to recover the guanidine nitrate by recrystallization of the reaction product from water after separating the insoluble by-product by hot filtration. The mother liquor after extraction of the guanidine nitrate still contains useful material, principally guanidine nitrate, ammonium nitrate and urea, and should be dehydrated by heating to an elevated temperature and recycled in the process.

In the process, operated in either a batch or a continuous manner, large quantities of water are used in the purification and recovery stages which require plant capable of handling the resulting larger quantities of materials and the expenditure of heat to evaporate off this water.

It is an object of the present invention to provide an improved process, which avoids the use of large quantities of water, and which may be worked advantageously as a batch or as a continuous process for the manufacture of guanidine nitrate by the direct reaction of urea with ammonium nitrate in the presence of silica gel.

The invention is based upon the discovery that, whereas the melting point of the reaction product is well over 100° C., a liquid mixture of ammonium nitrate and urea having a melting point well below 100° C. can be provided by the addition of urea and good quality guanidine nitrate can be crystallized out from this melt at moderate temperatures without the addition of water.

In accordance with the invention, in the manufacture of guanidine nitrate by the reaction, in the presence of silica gel catalyst, of urea and ammonium nitrate in a molar ratio of urea to ammonium nitrate which is of the order of 1:1, urea is added to the products of the reaction to adjust the molar proportion of ammonium nitrate to urea therein to be within the range of proportions from about 65:35 to about 30:70 so that the melting point of the mixture of ammonium nitrate and urea is well below 100° C. Preferably urea is added so that the molar proportion of ammonium nitrate to urea is made of the order of equimolar proportions (between about 60:40 to about 40:60) so that the melting point of the mixture of ammonium nitrate and urea is not more than about 70° C. and, when the melt is allowed to crystallize, solid guanidine nitrate is obtained with anhydrous mother liquor containing urea and ammonium nitrate.

In a continuous process in accordance with the invention after crystallizing out the guanidine nitrate from the reaction products, the resulting mother liquor is recycled back to the beginning of the reaction process.

In a particular process in which guanidine nitrate and urea are reacted together in substantially equimolar proportions, the amount of urea added to the reaction product is sufficient to make the proportion therein the same substantially equimolar proportion so that the proportion in the recycled mother liquor is conveniently the same as the proportion in the feed to the reactors.

A continuous process for producing guanidine nitrate from urea and ammonium nitrate in acocrdance with the invention will now be described, by way of example, with reference to the accompanying drawings in which:

FIGURE 3 is a graph showing the reaction rate of urea with ammonium nitrate at various temperatures; while

Figure 1:
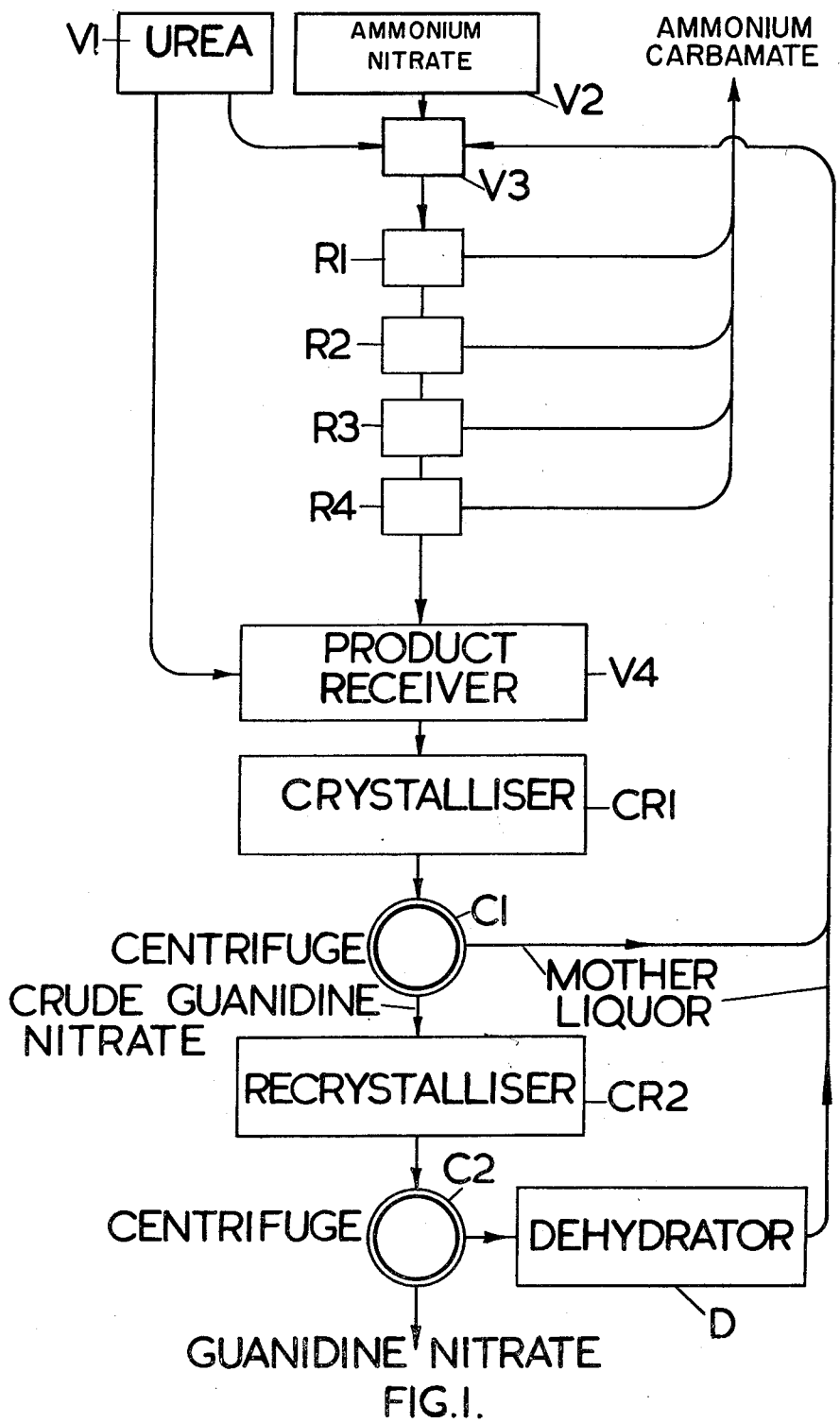
FIGURE 1 is a schematic diagram of the apparatus for carrying out a continuous process.

The apparatus as shown schematically in FIGURE 1, has four reactors R1 to R4 in cascade to which is added continuously from a feed vessel V3 an intimate mixture of urea and ammonium nitrate from supply vessels V1 and V2 and recycled mother liquor as hereafter described.

One form of reactor to give satisfactory results consists of a cylindrical reaction vessel in which the silica gel is contained in an open mesh basket supported on a vertical shaft which is slowly rotated in the fused mixture of ammonium nitrate and urea. The mesh size of the basket is of course less than that of the silica gel granules, for example, a 100 mesh basket is used to support 18/30 mesh silica gel.

Ammonium carbamate is drawn off from the reactors R1 to R4 and can be converted by any well established process to urea which can be recycled.

The liquid output from the reactors R1 to R4 is collected in the receiver V4 to which more urea is supplied to adjust the molar ratio of ammonium nitrate to urea to a desired value. The resulting mixture is passed to a crystallizer CR1 in which guanidine nitrate crystals are formed. These crystals are separated from the mother liquor in a centrifuge C1, recrystallized in water in a vessel CR2 to produce pure guanidine nitrate crystals which are separated from their aqueous mother liquor in a further centrifuge C2. Mother liquor from the centrifuge C1 and mother liquor from the centrifuge C2, dehydrated by the dehydrator D, are recycled as shown back to the reactors R1 to R4. It will be appreciated that only a relatively small quantity of water is used in the recrystallization stage.

Instead of adding urea alone to the reaction product, a mixture of urea and ammonium nitrate may be added (with urea in sufficient excess to produce the desired urea to ammonium nitrate ratio) in sufficient quantity to form a satisfactory solvent for the guanidine nitrate and it will be understood that where in the claims the addition of urea to the reaction product is specified, the urea may or may not be accompanied by some ammonium nitrate.

A sufficient quantity of a urea and ammonium nitrate mixture may be added to the reaction product to provide enough mother liquor for recycling to sustain a continuous process without the addition of fresh urea and ammonium nitrate to the vessel V3. If this is done the feed vessel V3 may be eliminated.

Figure 2:
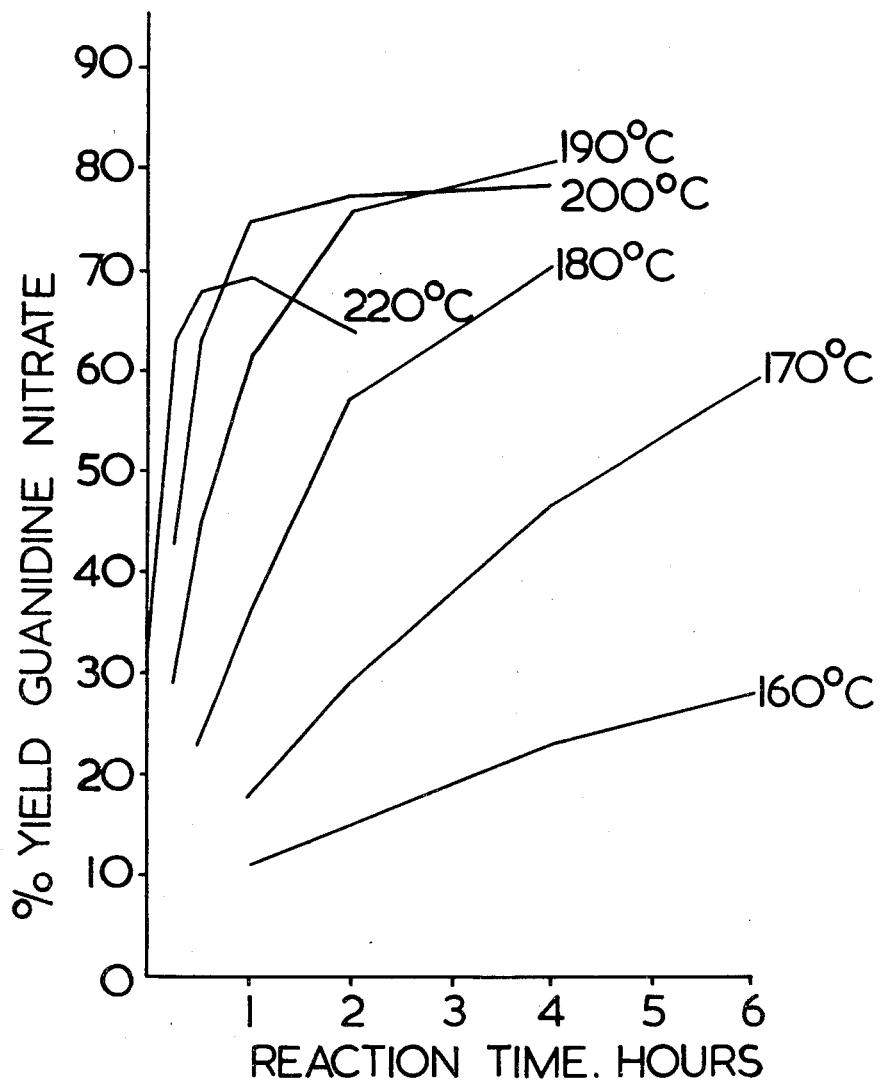
FIGURE 2 is a graph showing the melting point of the binary system ammonium nitrate-urea.

FIGURE 2 shows the rate at which guanidine nitrate is produced at various reaction temperatures from a reaction mixture having a molar ratio urea:ammonium nitrate:silica gel (200/300 mesh) of 2:2:1. The percentage yield of guanidine nitrate given in the graph is the percentage of a mole of guanidine nitrate produced per mol of urea. It will be seen that a 75% yield of guanidine nitrate is obtained in about one hour at a temperature of 200° C. This yield is, however, not obtained until after at least five hours at 180° C. and it is not worth while continuing with the reaction at this temperature for more than about two to three hours when about a 60% yield of guanidine nitrate has been obtained and there is still some unreacted urea and ammonium nitrate.

The reaction vessels R1 to R4 are however preferably maintained at a temperature around 180° C. (with a residence time of two to three hours) as at this temperature, very little or no separation of insoluble byproduct occurs in any of the reactors, whereas at 200° C. more insoluble by-product separates out causing foaming in the reactors, the reaction product then containing appreciably more water-insoluble material than is obtained at about 180° C.

Figure 3:
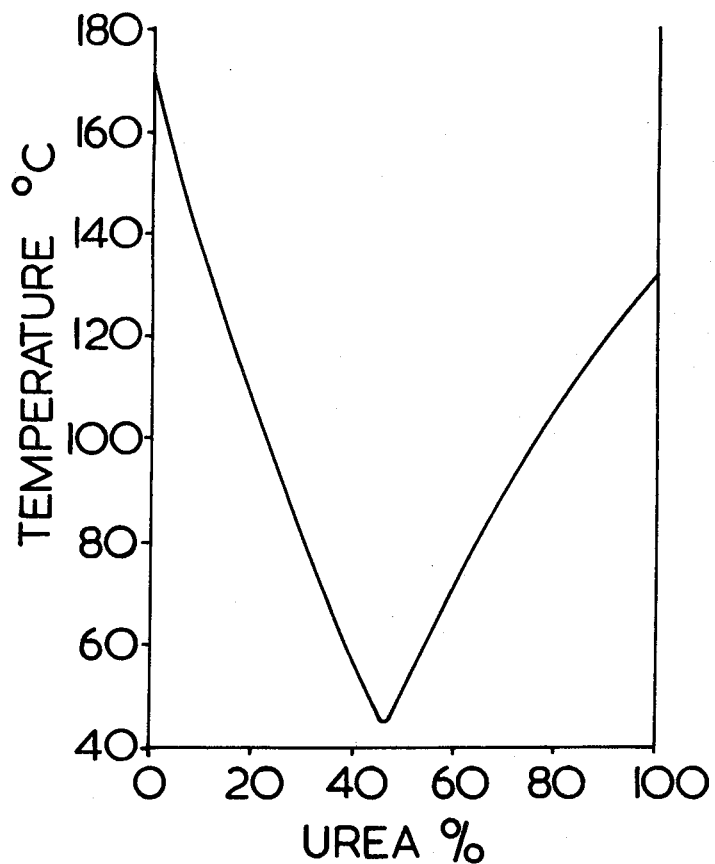

The liquid output from the reactors (consisting essentially of guanidine nitrate, unreacted ammonium nitrate and usually some unreacted urea) is passed to the receiver V4 and fresh urea is added to form a binary ammonium nitrate and urea mixture which has a melting point which is in any case less than 100° C. and is generally below 80° C. and is preferably not more than about 60° C. The melting point curve of this binary system is shown in FIGURE 3 on a base which shows the percent of urea by weight. From the graph it can be seen that if the proportion of urea by weight lies between about 30 and 64% the melting point is not more than about 80° C. so that if the molar ratio of ammonium nitrate:urea is arranged to be between about 65:35 and about 30:70 the melting point will be not more than about 80° C., that is well below 100° C. The graph also shows that the proportion of urea is preferably in the middle portion of the said range 30 to 64%, the melting point being less than 70° C. if the percent weight of urea is between about 35 and 60%, less than 60° C. if the percent weight is between about 39 and 54%, and less than 50° C. if the percent weight is between about 45 and 50%. From the mixture thus formed by the addition of urea, guanidine nitrate can be crystallized out in the vessel CR1 at a temperature always less than 100° C. and usually less than the 80° C. and with near optimum additions of urea at about 60° C.

A detailed description will now be given by way of example of a typical run in which smooth operation had been maintained for prolonged periods.

The feed rate was 113.2 gm. per hour of an equimolar mixture of urea and ammonium nitrate and each reactor contained 30 gm. silica gel (18/30 mesh); the average residence time was 2¾ hours. When operating under these conditions the molar ratio of reactants, urea:ammonium nitrate:silica gel, calculated with regard to mean residence time was about 2:2:1.7. The reactors were maintained at a temperature of 178° to 180° C.

The reaction product, yield about 84.6 gm. per hour, had the following approximate composition: guanidine nitrate, 35.0%; ammonium nitrate, 53.5%; urea, 11.2%; and insoluble by-product, 0.3%. The total amount of guanidine nitrate produced was about 70 gm. per gm. $SiO_2$ of silica gel present. The conversion of urea to guanidine nitrate was of the order of 60% (1 mol urea/ 1 mol guanidine nitrate).

The ratio of guanidine nitrate to ammonium carbamate, i.e. the gas phase in the reaction, was estimated to be 1:1.25.

The reaction product varied only slightly in composition throughout the runs indicating that the silica gel maintained its activity.

A prolonged trial was carried out under the above conditions, recycling mother liquor after adjusting the molar ratio of urea:ammonium nitrate to 1:1 by addition of fresh urea to the reaction product at 140° C., and crystallizing and isolating the guanidine nitrate by centrifugal separation at 60° C.

Figure 4:
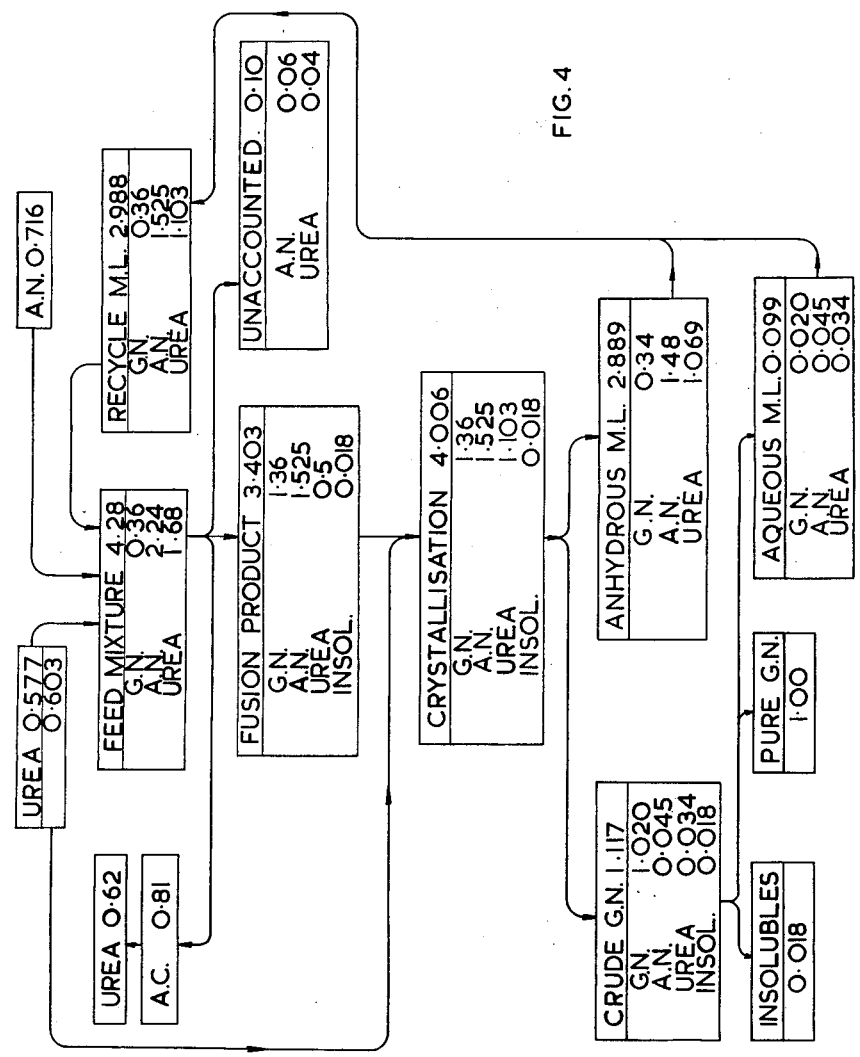
FIGURE 4 is a flowsheet showing the parts by weight of material at the various stages of a process carried out with an initial molar ratio of urea:ammonium nitrate:silica gel of 2:2:1.7.

The material balance flowsheet of the trial is shown in FIGURE 4. The quantity of each substance is given in parts by weight for each unit part by weight of guanidine nitrate. In the figure, G.N. stands for guanidine nitrate, A.N. for ammonium nitrate, A.C. for ammonium carbamate, and M.L. for mother liquor. It will be seen that guanidine nitrate of about 90% purity was produced and after recrystallization from water, crystals having a purity in excess of 99% were obtained while aqueous mother liquor from the guanidine nitrate purification contains about 4% of the urea and ammonium nitrate present in the original reaction product.

We claim:

1. In a process for the manufacture of guanidine nitrate wherein urea is reacted with ammonium nitrate in equimolar proportions in the presence of silica gel to yield anhydrous reaction product containing guanidine nitrate and some unreacted ammonium nitrate, the improvement of adding urea to the anhydrous reaction product to adjust the molar proportion of ammonium nitrate to urea to a value within the range of proportions from about 65:35 to about 30:70 so that the melting point of the resulting anhydrous mixture of guanidine nitrate and urea is well below 100° C., and then crystallizing out crude guanidine nitrate from the anhydrous reaction product and recycling the resulting anhydrous mother liquor to the feed, adding a small amount of water to the crude guanidine nitrate and recrystallizing the crude guanidine nitrate to obtain a purified guanidine nitrate product and an aqueous mother liquor, dehydrating the small amount of water from the aqueous mother liquor before recycling to the feed.

2. In a process for the manufacture of guanidine nitrate wherein urea is reacted with ammonium nitrate in equimolar proportions and in the presence of silica gel to yield anhydrous reaction product containing a guanidine nitrate and some unreacted ammonium nitrate, the improvement of adding urea to the anhydrous reaction product to adjust the molar proportion of ammonium nitrate to urea to a value within the range of proportions from about 60:40 to about 40:60 so that the melting point of the resulting anhydrous mixture of ammonium nitrate and urea is well below 80° C., and then crystallizing out crude guanidine nitrate from the anhydrous reaction product and recycling the resulting anhydrous mother liquor to the feed, adding a small amount of water to the crude guanidine nitrate and recrystallizing the crude guanidine nitrate to obtain a purified guanidine nitrate product and an aqueous mother liquor, dehydrating the small amount of water from the aqueous mother liquor before recycling to the feed.

3. In a process for the manufacture of guanidine nitrate wherein urea is reacted with ammonium nitrate in equimolar proportions in the presence of silica gel to yield anhydrous reaction product containing guanidine nitrate and some unreacted ammonium nitrate, the improvement of adding urea to the anhydrous reaction product to adjust the molar proportion of ammonium nitrate to urea to a value within the range of proportions from about 50:50 to about 45:55 so that the melting point of the resulting anhydrous mixture of ammonium nitrate and urea is below 60° C., and then crystallizing out crude guanidine nitrate from the anhydrous reaction product and recycling the resulting anhydrous mother liquor to the feed, adding a small amount of water to the crude guanidine nitrate and recrystallizing the crude guanidine nitrate to obtain a purified guanidine nitrate product and an aqueous mother liquor, dehydrating the small amount of water from the aqueous mother liquor before recycling to the feed.

References Cited in the file of this patent

UNITED STATES PATENTS

| | | |
|---|---|---|
| 2,783,276 | Boatright | Feb. 26, 1957 |
| 2,850,533 | O'Neall | Sept. 2, 1958 |

FOREIGN PATENTS

| | | |
|---|---|---|
| 527,746 | Canada | July 17, 1956 |

OTHER REFERENCES

Herring et al.: Ind. Eng. Chem., vol. 38, pages 1315–1319 (1946).

Morton: Laboratory Technique in Organic Chemistry, published by McGraw-Hill Book Company, Inc., (New York and London), 1938, pp. 154, section 129.

Tipson et al.: Technique of Organic Chemistry, vol. III, published by Interscience Publishers, Inc. (New York), 1950, p. 409.

Cumming et al.: Systematic Organic Chemistry, published by D. Van Nostrand Company (New York), 1925, p. 30.